US010324563B2

(12) United States Patent
Tretter et al.

(10) Patent No.: US 10,324,563 B2
(45) Date of Patent: Jun. 18, 2019

(54) IDENTIFYING A TARGET TOUCH REGION OF A TOUCH-SENSITIVE SURFACE BASED ON AN IMAGE

(71) Applicant: Hewlett-Packard Development Company, L.P., Houston, TX (US)

(72) Inventors: Daniel R Tretter, San Jose, CA (US); Jinman Kang, San Diego, CA (US); Kar Han Tan, Sunnyvale, CA (US); Wei Hong, Sunnyvale, CA (US); Bradley N Suggs, Sunnyvale, CA (US); David Bradley Short, San Diego, CA (US); Otto Sievert, Oceanside, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 7 days.

(21) Appl. No.: 15/024,100

(22) PCT Filed: Sep. 24, 2013

(86) PCT No.: PCT/US2013/061398
§ 371 (c)(1),
(2) Date: Mar. 23, 2016

(87) PCT Pub. No.: WO2015/047223
PCT Pub. Date: Apr. 2, 2015

(65) Prior Publication Data
US 2016/0231862 A1    Aug. 11, 2016

(51) Int. Cl.
*G06F 3/041*    (2006.01)
*G06F 3/042*    (2006.01)
(Continued)

(52) U.S. Cl.
CPC ........ *G06F 3/0418* (2013.01); *G06F 3/03545* (2013.01); *G06F 3/0416* (2013.01);
(Continued)

(58) Field of Classification Search
CPC .................. G06F 3/0418; G06F 3/03545; G06F 3/0416; G06F 3/0425; G06F 2203/04106;
(Continued)

(56) References Cited

U.S. PATENT DOCUMENTS 6,044,165 A    3/2000 Perona et al.
6,246,395 B1    6/2001 Goyins et al.
(Continued)

FOREIGN PATENT DOCUMENTS

CN    102109925    6/2011
CN    102426480    4/2012
(Continued)

OTHER PUBLICATIONS

Agarwal et al., "High Precision Multi-touch Sensing on Surfaces using Overhead Cameras," TABLETOP'07, IEEE Workshop—4 pages.
(Continued)

*Primary Examiner* — Rodney Amadiz
(74) *Attorney, Agent, or Firm* — HP Inc. Patent Department

(57) ABSTRACT

Examples disclosed herein relate to identifying a target touch region of a touch-sensitive surface based on an image. Examples include a touch input detected at a location of a touch-sensitive surface, an image representing an object disposed between a camera that captures the image and the touch-sensitive surface, identifying a target touch region of a touch-sensitive surface based on an image, and rejecting the detected touch input when the location of the detected
(Continued)

touch input is not within any of the at least one identified target touch region of the touch-sensitive surface.

21 Claims, 7 Drawing Sheets

(51) Int. Cl.
G06F 3/0354 (2013.01)
G09G 3/00 (2006.01)
G06T 7/73 (2017.01)
G06T 7/50 (2017.01)
G06T 7/12 (2017.01)

(52) U.S. Cl.
CPC ............. *G06F 3/0425* (2013.01); *G06T 7/12* (2017.01); *G06T 7/50* (2017.01); *G06T 7/75* (2017.01); *G09G 3/002* (2013.01); *G06F 2203/04106* (2013.01); *G09G 2360/144* (2013.01)

(58) Field of Classification Search
CPC .... G06T 7/50; G06T 7/12; G06T 7/75; G09G 3/002; G09G 2360/144
See application file for complete search history.

(56) References Cited

U.S. PATENT DOCUMENTS

| | | | |
|---|---|---|---|
| 6,633,671 | B2 | 10/2003 | Munich et al. |
| 7,023,536 | B2 | 4/2006 | Zhang et al. |
| 7,038,846 | B2 | 5/2006 | Mandella |
| 7,088,440 | B2 | 8/2006 | Buermann et al. |
| 7,110,100 | B2 | 9/2006 | Buermann et al. |
| 7,113,270 | B2 | 9/2006 | Buermann et al. |
| 7,161,664 | B2 | 1/2007 | Buermann et al. |
| 7,203,384 | B2 | 4/2007 | Carl et al. |
| 7,268,956 | B2 | 9/2007 | Mandella et al. |
| 7,433,024 | B2 | 10/2008 | Garcia et al. |
| 7,474,809 | B2 | 1/2009 | Carl et al. |
| 7,477,241 | B2 | 1/2009 | Lieberman et al. |
| 7,561,146 | B1 | 7/2009 | Hotelling |
| 7,599,561 | B2 | 10/2009 | Wilson et al. |
| 7,710,391 | B2 | 5/2010 | Bell et al. |
| 7,729,515 | B2 | 6/2010 | Mandella et al. |
| 7,826,641 | B2 | 11/2010 | Mandella et al. |
| 7,834,855 | B2 | 11/2010 | Hotelling et al. |
| 7,961,909 | B2 | 6/2011 | Mandella et al. |
| 8,121,640 | B2 | 2/2012 | Russ et al. |
| 8,134,637 | B2 | 3/2012 | Rossbach et al. |
| 8,199,117 | B2 | 6/2012 | Izadi et al. |
| 8,294,047 | B2 | 10/2012 | Westerman et al. |
| 8,348,747 | B2 | 1/2013 | Arezina et al. |
| 8,401,225 | B2 | 3/2013 | Newcombe et al. |
| 8,736,583 | B2 | 5/2014 | Anderson et al. |
| 8,897,494 | B2 | 11/2014 | Mandella et al. |
| 2002/0065121 | A1 | 5/2002 | Fukunaga et al. |
| 2005/0078092 | A1 | 4/2005 | Clapper |
| 2005/0168437 | A1 | 8/2005 | Carl et al. |
| 2007/0216894 | A1 | 9/2007 | Garcia et al. |
| 2007/0268273 | A1 | 11/2007 | Westerman et al. |
| 2007/0279494 | A1 | 12/2007 | Aman et al. |
| 2008/0018591 | A1 | 1/2008 | Pittel et al. |
| 2008/0196945 | A1 | 8/2008 | Konstas |
| 2009/0309838 | A1 | 12/2009 | Adan et al. |
| 2010/0302376 | A1 | 12/2010 | Boulanger et al. |
| 2011/0227876 | A1 | 9/2011 | Ilmonen |
| 2011/0227915 | A1 | 9/2011 | Mandella et al. |
| 2011/0242054 | A1 | 10/2011 | Tsu |
| 2011/0293179 | A1 | 12/2011 | Dikmen et al. |
| 2012/0038549 | A1 | 2/2012 | Mandella et al. |
| 2012/0069169 | A1* | 3/2012 | Dejima ................. G06F 3/0426 348/77 |
| 2012/0089348 | A1* | 4/2012 | Perlin ..................... G06F 3/005 702/41 |
| 2012/0127070 | A1 | 5/2012 | Ryoo et al. |
| 2012/0158629 | A1 | 6/2012 | Hinckley et al. |
| 2012/0262407 | A1 | 10/2012 | Hinckley et al. |
| 2012/0327089 | A1 | 12/2012 | Lee et al. |
| 2013/0050133 | A1 | 2/2013 | Brakensiek et al. |
| 2013/0057515 | A1 | 3/2013 | Wilson |
| 2013/0077236 | A1 | 3/2013 | Becze et al. |
| 2013/0136358 | A1 | 5/2013 | Dedhia et al. |
| 2013/0194418 | A1 | 8/2013 | Gonzalez-Banos et al. |
| 2013/0222287 | A1 | 8/2013 | Bae et al. |
| 2013/0230237 | A1 | 9/2013 | Schlosser et al. |
| 2013/0234992 | A1 | 9/2013 | Hodges et al. |
| 2013/0246861 | A1 | 9/2013 | Colley et al. |
| 2013/0300659 | A1 | 11/2013 | Kang et al. |
| 2014/0029788 | A1 | 1/2014 | Kang |
| 2014/0168367 | A1 | 6/2014 | Kang |
| 2015/0160741 | A1* | 6/2015 | Jesme ..................... G06F 3/017 345/156 |

FOREIGN PATENT DOCUMENTS

| | | |
|---|---|---|
| CN | 103154867 | 6/2013 |
| TW | 201209680 | 3/2012 |
| TW | I390436 | 3/2013 |
| TW | I399682 | 6/2013 |
| WO | WO-2010/135809 A1 | 12/2010 |
| WO | WO-2012/041419 A1 | 4/2012 |
| WO | WO-2013081818 | 6/2013 |
| WO | WO-2015016864 | 2/2015 |
| WO | WO-2015076811 | 5/2015 |

OTHER PUBLICATIONS

Au et al., "Skeleton Extraction by Mesh Contraction," 2008, Proceedings for SIGGAPH 2008—10 pages.

Bergh, M.V.D. et al., Combining RGB and ToF Cameras for Real-time 3D Hand Gesture Interaction, (Research Paper), Oct. 24, 2010—7 pages.

Choi et al., "Extraction of the Euclidean skeleton based on a connectivity criterion," 2003, Pattern Recognition 36, No. 3, pp. 721-729.

Chung et al., "MirrorTrack—A Real-Time Multiple Camera Approach for Multi-touch interactions on Glossy Display Surfaces,", 2008, AIPR'08, pp. 1-5.

Fisher et al., "Skeletonization/Medial Axis Transform," Nov. 26, 2012, <http://web.archive.org/web—6 pages.

Gao, Rui et al; Microsoft Research—Mobile Surface; Microsoft Research; 2010; http://research.microsoft.com—1 Page.

Hand, Randall; Infinite Z Launches zSpace Virtual Holographic 3D Display forDesigners; VizWorld.com Dec. 13, 2011; 2 pages.

Harrison, Beverly & Ziola, Ryder; Bringing Toys to Life: Intel Labs Oasis Project; Augmented Engineering; Jan. 26, 2011; 1 page.

Harrison, Chris et al; OmniTouch: Wearable Muititioucti Interaction Everywhere; UIST'11; Oct. 16, 2011; Santa Barbara, California; 10 pages.

Hartmann, Bjorn et al; Pictionaire: Supporting Collaborative Design Work by Integrating Physical and Digital Artifacts; CSCW 2010; 4 pages.

Hinckley, Ken et al; Pen+Touch=New Tools; UIST'10; 10 pages.

Junuzovic, Sasa et al; Microsoft Research—IllumiShare; Microsoft Research 2012; http://delivery.acm.org 2 Pages.

Kane, Shaun K. et al; Bonfire: A Nomadic System for Hybrid Laptop-Tabletop Interaction; UIST'09; Oct. 4, 2009; 10 pages.

Katz, I. et al., A Multi-touch Surface Using Multiple Cameras, (Research Paper), Jun. 3, 2007, <http://wsnl2.stanford.edu/papers—12 pages.

Linder, Natan et al; LuminAR: Portable Robotic Augmented Reality Interface Design and Prototype; UIST'10, Oct. 3, 2010; New York,—2 pages.

Litomisky, K., Consumer RGB-D Cameras and Their Applications, (Research Paper), Spring 2012 UC Riverside—20 pages.

Melanson, Donald; Microsoft Research Working on Portable Surface; Mar. 2, 2010; http://www.engadget.com—2 pages.

(56) References Cited

OTHER PUBLICATIONS

Melanson, Donald: Wiimote Repurposed for Multi-Point interactive Whiteboard Dec. 10, 2007: http://www.engadget.com—2 [ages.

Salamati et al., "Semantic Image Segmentation Using Visible and Near-Infrared Channels," Computer Vision—ECCV 2012, pp. 461-471.

Sato et al., "TEASAR: Tree-structure Extraction Algorithm for Accurate and Robust Skeletons," 2000, 8th Pacific Conf on Computer Graphics and Applications—6 pages.

Shahram et al., "C-Slate: A Multi-Touch and Object Recognition System for Remote Collaboration using Horizontal Surfaces," IEEE Workshop—Tabletops 2007, pp. 3-10.

Sidik, M.K.B.M. et al., A Study on Natural Interaction for Human Body Motion Using Depth Image Data, (Research Paper), IEEE, 2011, pp. 97-102.

Simonite, Tom; A Kitchen Countertop With a Brain MIT Technology Review; Jul. 2, 2010; http://www.technologyreview.com/news—2 pages.

SoftKinetic, "DS525 Datasheet," Short Range Module, Mar. 8, 2013, <http://www.tiii.be—2 pages.

Sturm, J. et al., "Towards a benchmark for RGB-D SLAM evaluation," Jun. 2011, RGB-D Workshop—RSS—2 pages.

Van den Bergh et al., "Haarlet-based hand gesture recognition for 3D interaction," IEEE Workshop on Applications of Computer Vision (WACV 2009)—9 pages.

Westerman, W., Hand Tracking, Finger Identification, and Chordic Manipulation on a Multi-touch Surface, (Research Paper), Sep. 2, 2003.—363 pages.

Wikipedia, "Sensor fusion," Jul. 31, 2013, <http://en.wikipedia.org—4 pages.

Wikipedia, "Leap Motion," Aug. 15, 2013, retrieved from: <http://en.wikipedia.org/wiki/Leap_Motion>. 3 pages.

Wilson, Andrew D. et al; Combining Multiple Depth Cameras and Projectors for Interactions On, Above, and Between Surfaces; UIST'10; 10 pages.

Wilson, Andrew D.; Using a Depth Camera as a Touch Sensor; ITS 2010: Devices Algorithms; Nov. 7, 2010; 4 pages.

Korean Intellectual Property Office, International Search Report and Written Opinion for PCT/US2013/061398 dated Jun. 20, 2014 (12 pages).

\* cited by examiner

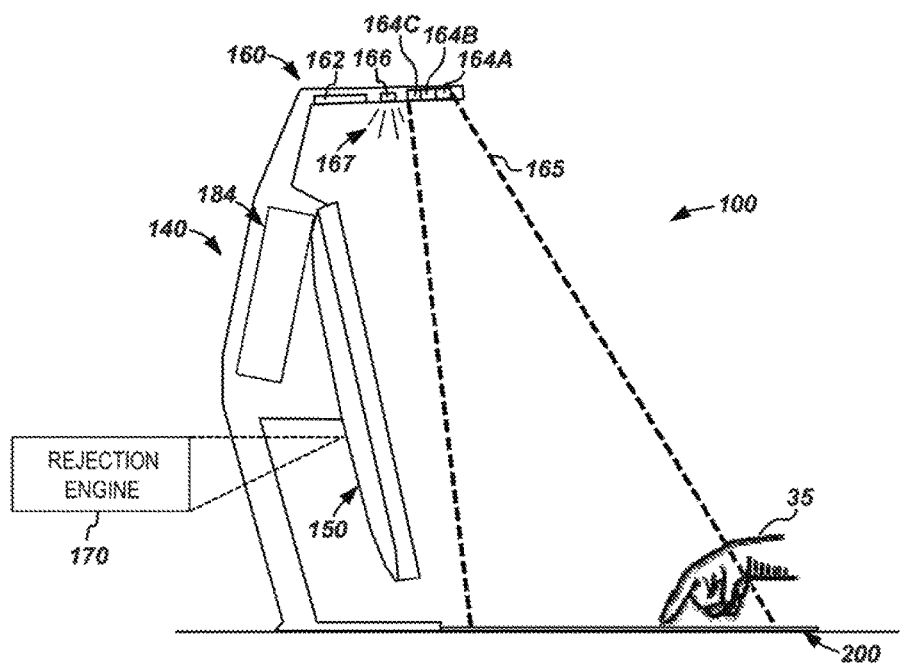
FIG. 7A
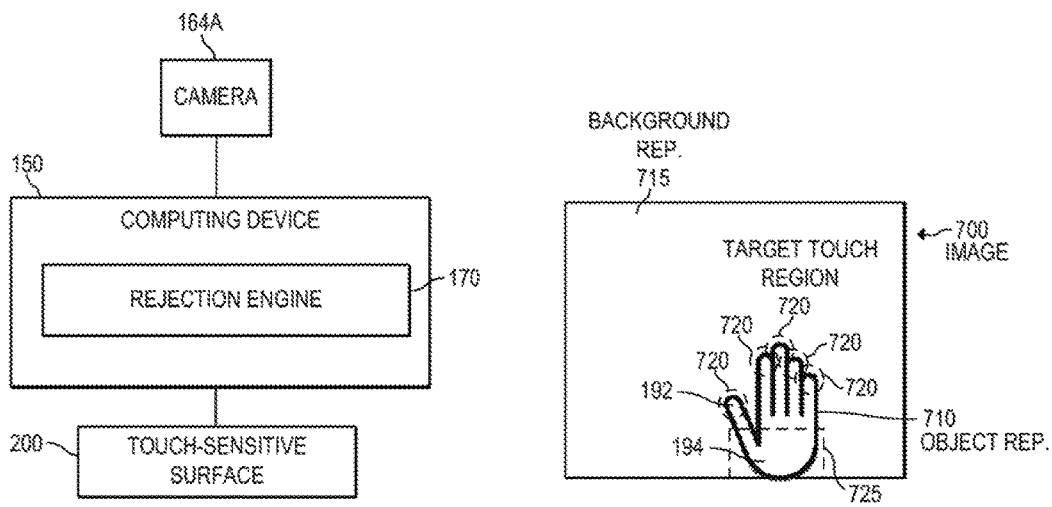
FIG. 7B
FIG. 7C

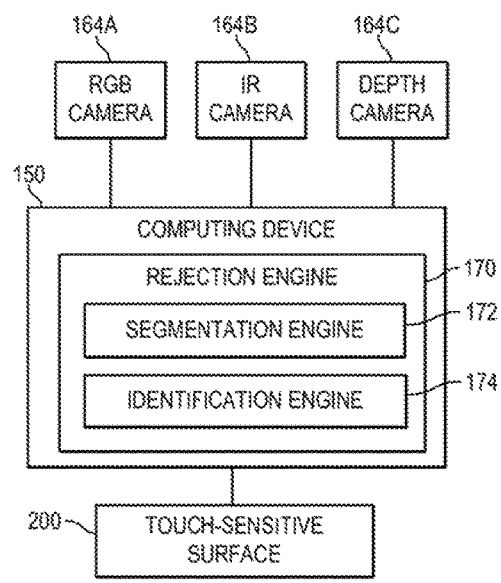
*FIG. 7D*
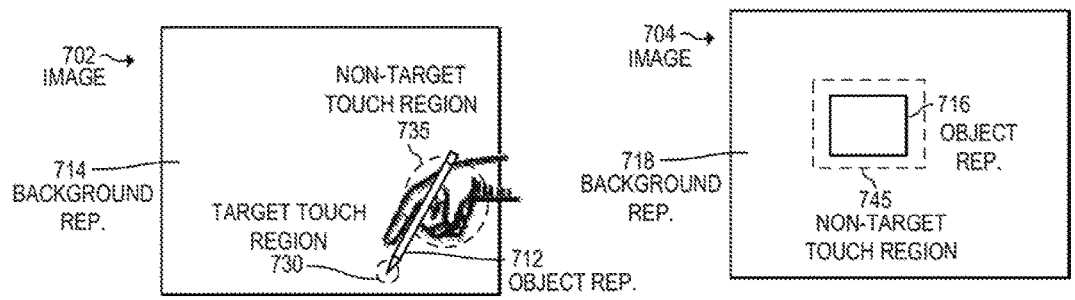
*FIG. 7E*          *FIG. 7F*

IDENTIFYING A TARGET TOUCH REGION OF A TOUCH-SENSITIVE SURFACE BASED ON AN IMAGE

BACKGROUND

Many computing systems include at least one display and at least one input device. The display may include, for example, a monitor, a screen, or the like. Example input devices include a mouse, a keyboard, a touchpad, or the like. Some computing systems include a touch-sensitive display to both display output of the computing system and receive physical (e.g., touch) input.

BRIEF DESCRIPTION OF THE DRAWINGS

The following detailed description references the drawings, wherein:

FIG. 7A is a schematic side view of the example computing system of FIG. 1 illustrating an example of image capturing;

FIG. 7B is a block diagram of an example of a portion of the computing system of FIG. 1 comprising the rejection engine;

FIG. 7C is an example image of an object disposed over a touch-sensitive surface of a computing system;

FIG. 7D is a block diagram of another example of a portion of the computing system of FIG. 1 comprising the rejection engine;

FIG. 7E is another example image of an object disposed over a touch-sensitive surface of a computing system;

FIG. 7F is another example image of an object disposed over a touch-sensitive surface of a computing system;

DETAILED DESCRIPTION

Figure 1:
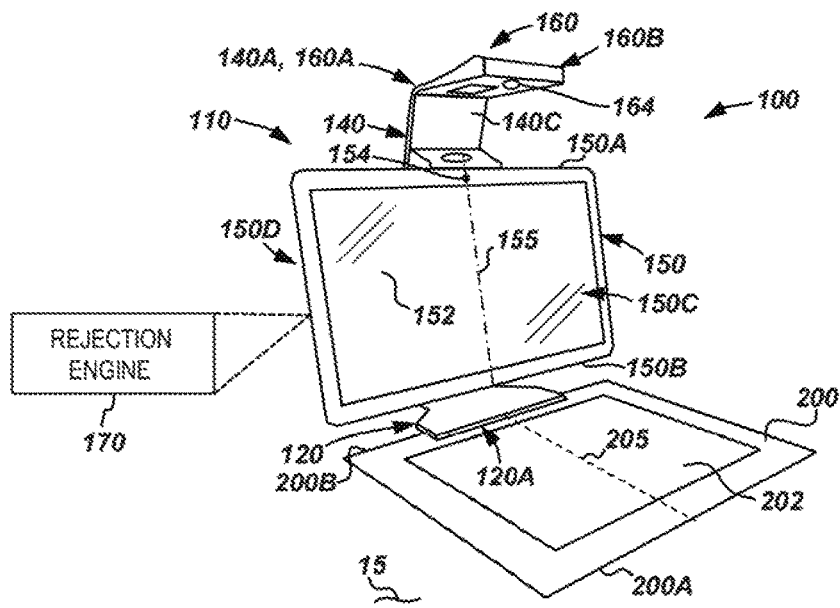
FIG. 1 is a schematic perspective view of an example computing system comprising a rejection engine.

In a computing system utilizing a touch-sensitive input device to detect physical contact with the device as touch input, it may be difficult to distinguish between physical contact with the device that is intended as touch input and unintended or accidental physical contact with the touch-sensitive input device. For example, when utilizing a touch-sensitive surface capable of detecting touches made by a hand, it may be difficult to distinguish between physical contact made by the fingertips that is intended as input and physical contact made by the palm resting on the surface and not intended as input.

To address these issues, examples described herein may determine at least one target touch region of a touch-sensitive surface of a computing system based on an image of the surface captured by a camera pointed at the surface, and reject touch input at a location that is not within any of the identified target touch region(s). Examples described herein may include a touch-sensitive surface to detect a touch input at a location of the touch-sensitive surface, a camera pointed at the touch-sensitive surface to capture an image representing an object disposed between the given camera and the touch-sensitive surface, and a rejection engine to identify, based on characteristics of the object represented in the image, at feast one target touch region of the touch-sensitive surface for receiving touch input. In examples described herein, the rejection engine is to reject the detected touch input in response to a determination that the location of the detected touch input is not within any identified target touch region(s) of the touch-sensitive surface.

In this manner, examples described herein may use an image of an object disposed over a touch-sensitive surface to determine whether a particular touch input detected by the surface is likely to be an intended touch or not based on the characteristics (e.g., location, position, orientation, shape, etc.) of the object represented in the image, and reject the touch input if it is likely to be an unintended touch. For example, examples described herein may determine that locations of the surface proximate to fingertips of a hand over the touch-sensitive surface are target touch regions (i.e., for receiving intended touch inputs) white the target touch regions exclude locations under a palm of the hand. In such examples, touch input received when the palm touches the surface (e.g. unintentionally) may be rejected, as the location of that touch input is not within any of the target touch regions.

Referring now to the drawings, FIGS. 1-7A are schematic views of an example computing system 100 comprising a rejection engine 170. In the example of FIGS. 1-7A, system 100 generally comprises a support structure 110, a computing device 150, a projector unit 180, and a touch-sensitive surface 200. Computing device 150 may include rejection engine 170 to reject a touch input detected by surface 200 in response to a determination that the location of the detected touch input is not within any target touch region of surface 200 determined based on an image, as described above.

Computing device 150 may comprise any suitable computing device complying with the principles disclosed herein. As used herein, a "computing device" may comprise an electronic display device, a smartphone, a tablet, a chip set, an all-in-one computer (e.g., a device comprising a display device that also houses processing resource(s) of the computer), a desktop computer, a notebook computer, workstation, server, any other processing device or equipment, or a combination thereof. In this example, device 150 is an all-in-one computer having a central axis or center line 155, first or top side 150A, a second or bottom side 150B axially opposite the top side 150A, a front side 150C extending axially between sides 150A and 150B, a rear side 150D also extending axially between sides 150A and 150B and generally radially opposite front side 150C. A display 152 is disposed along front side 150C and defines a viewing surface of computing system 100 to display images for viewing by a user of system 100. In examples described herein, a display may include components of any technology suitable for displaying images, video, or the like.

In some examples, display 152 may be a touch-sensitive display. In examples described herein, a touch-sensitive display may include, for example, any suitable technology (e.g., components) for displaying images, video, or the like, and may include any suitable technology (e.g., components) for detecting physical contact (e.g., touch input), such as, for example, a resistive, capacitive, surface acoustic wave, infrared (IR), strain gauge, optical imaging, acoustic pulse recognition, dispersive signal sensing, or in-cell system, or the like. In examples described herein, display 152 may be referred to as a touch-sensitive display 152. Device 150 may further include a camera 154, which may be a web camera, for example. In some examples, camera 154 may capture Images of a User positioned in front of display 152. In some examples, device 150 may also include a microphone or other device to receive sound input (e.g., voice input from a user).

Figure 2:
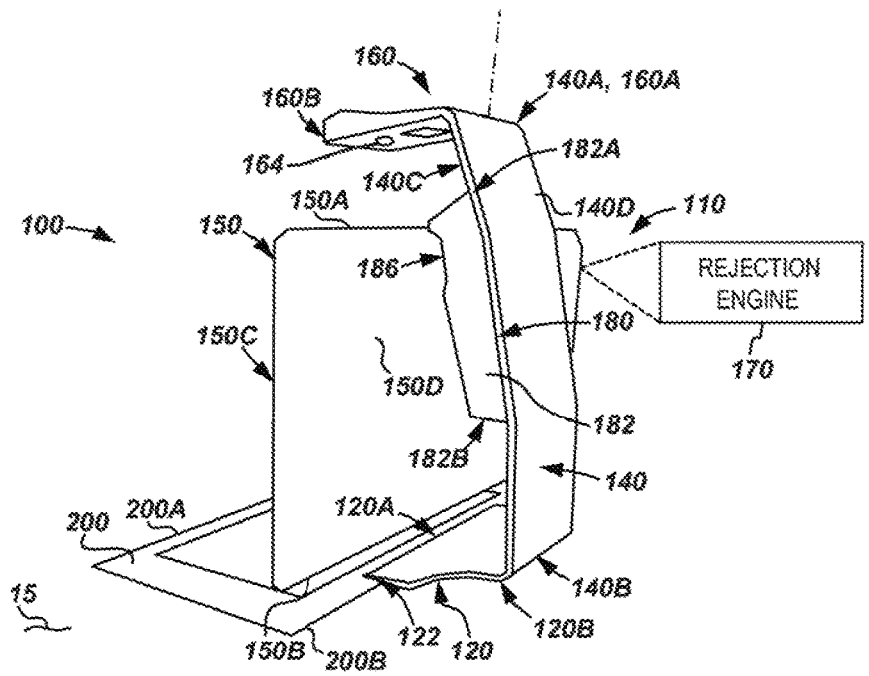
FIG. 2 is another schematic perspective view of the example computing system of FIG. 1.

In the example of FIGS. 1-7A, support structure 110 includes a base 120, an upright member 140, and a top 160. Base 120 includes a first or front end 120A, and a second or rear end 120B. Base 120 may engage with a support surface 15 to support the weight of at least a portion of the components of system 100 (e.g., member 140, unit 180, device 150, top 160, etc.). In some examples, base 120 may engage with support surface 15 in this manner when system 100 is configured for operation. In the example of FIGS. 1-7A, front end 120A of base 120 includes a raised portion 122 that may be disposed above and separated from support surface 15 (creating a space or clearance between portion 122 and surface 15) when base 120 is disposed on support surface 15 as illustrated in FIG. 2, for example. In such examples, a portion of a side of Touch-sensitive surface 200 may be disposed in (e.g., received within) the space formed between portion 122 and surface 15. In such examples, placing a portion of surface 200 within the space created by portion 122 and surface 15 may assist with the proper alignment of surface 200. In other examples, other suitable methods or devices may be used to assist with the alignment of surface 200.

Upright member 140 includes a first or upper end 140A, a second or lower end 140B opposite the upper end 140A, a first or front side 140C extending between the ends 140A and 140B, and a second or rear side 1400 opposite the front side 140C and also extending between the ends 140A and 140B. Lower end 140B of member 140 is coupled to rear end 120B of base 120, such that member 140 extends substantially upward from support surface 15.

Top 160 includes a first or proximate end 160A, a second or distal end 160B opposite the proximate end 160A, a top surface 160C extending between ends 160A and 160B, and a bottom surface 160D opposite the top surface 160C and also extending between ends 160A and 160B. Proximate end 160A of top 160 is coupled to upper end 140A of upright member 140 such that distal end 160B extends outward from upper end 140A of upright member 140. As such, in the example shown in FIG. 2, top 160 is supported at end 160A (and not at end 160B), and may be referred to herein as a cantilevered top. In some examples, base 120, member 140, and top 160 may be monolithically formed. In other examples, two or more of base 120, member 140, and top 160 may be formed of separate pieces (i.e., not monolithically formed).

Touch-sensitive surface 200 may include a central axis or centerline 205, a first or front side 200A, and a second or rear side 200B axially opposite the front side 200A. Touch-sensitive surface 200 may comprise any suitable technology for detecting physical contact with surface 200 as touch input. For example, touch-sensitive surface 200 may comprise any suitable technology for detecting (and in some examples tracking) one or multiple touch inputs by a user to enable the user to interact, via such touch input, with software being executed by device 150 or another computing device. In examples described herein, touch-sensitive surface 200 may be any suitable touch sensitive planar (or substantially planar) object, such as a touch-sensitive mat, tabletop, sheet, etc. In some examples, touch-sensitive surface 200 may be disposed horizontal (or approximately or substantially horizontal). For example, surface 200 may be disposed on support surface 15, which may be horizontal (or approximately or substantially horizontal).

In some examples, all or substantially all of surface 200 may be capable of detecting touch input as described above. In other examples, less than all of surface 200 may be capable of detecting touch input as described above. For example, surface 200 may comprise a touch-sensitive region 202, extending over less than all of surface 200, wherein region 202 is capable of detecting touch input as described above. In other examples, region 202 may extend over substantially all of surface 200 (e.g., may be substantially coterminous with surface 200). Region 202 may be substantially aligned with axis 205.

As described above, surface 200 may be aligned with base 120 of structure 110 to assist with proper alignment of surface 200 (e.g., at least during operation of system 100). In the example of FIGS. 1-7A, rear side 200B of surface 200 may be disposed between raised portion 122 of base 120 and support surface 15, such that rear end 200B is aligned with front side 120A of base 120 to assist with proper overall alignment of surface 200 (and particularly proper alignment of region 202) with other components of system 100. In some examples, surface 200 may be aligned with device 150 such that the center line 155 of device 150 is substantially aligned with center line 205 of surface 200. In other examples, surface 200 may be differently aligned with device 150.

In some examples, surface 200 and device 150 may be communicatively connected (e.g., electrically coupled) to one another such that user inputs received by surface 200 may be communicated to device 150. Surface 200 and device 150 may communicate with one another via any suitable wired or wireless communication technology or mechanism, such as for example, WI-FI, BLUETOOTH, ultrasonic technology, electrical cables, electrical leads, electrical conductors, electrical spring-loaded pogo pins with magnetic holding force, or the like, or a combination thereof. In the example of FIGS. 1-7A, exposed electrical contacts disposed on rear side 200B of surface 200 may engage with corresponding electrical pogo-pin leads within portion 122 of base 120 to communicate information (e.g., transfer signals) between device 150 and surface 200 during operation of system 100. In such examples, the electrical contacts may be held together by adjacent magnets (located in the clearance between portion 122 of base 120 and surface 15) to magnetically attract and hold (e.g., mechanically) a corresponding ferrous and/or magnetic material disposed along rear side 200B of surface 200.

Figure 3:
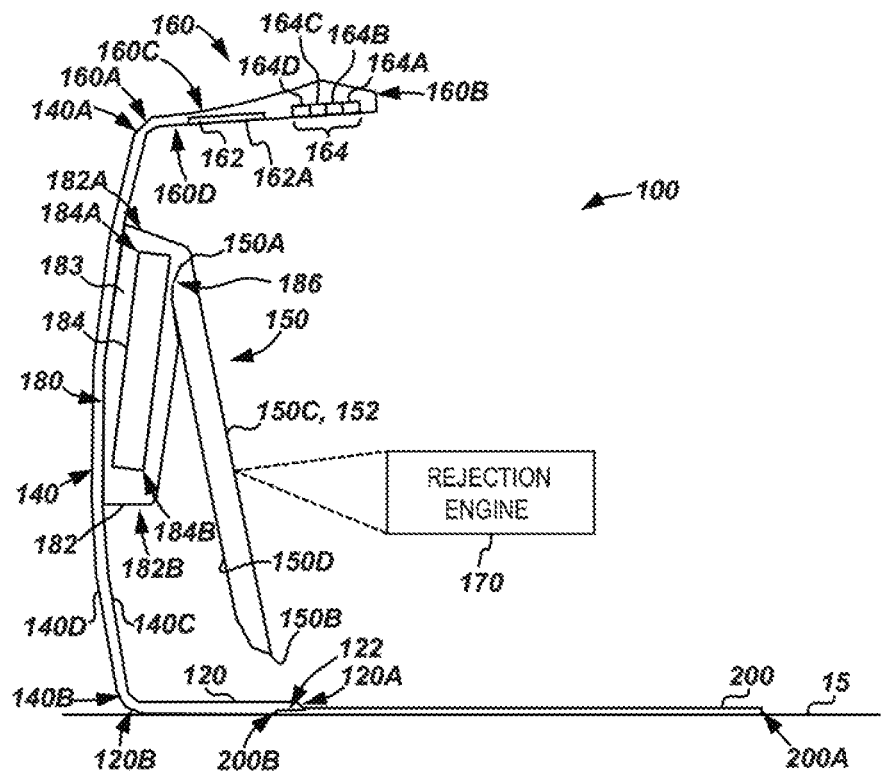
FIG. 3 is a schematic side view of the example computing system of FIG. 1.

Referring to FIG. 3, projector unit 180 comprises an outer housing 182, and a projector assembly 184 disposed within housing 182. Housing 182 includes a first or upper end 182A, a second or lower end 182B opposite the upper end 182A, and an inner cavity 183. In the example of FIG. 3, housing 182 further includes a coupling or mounting member 186 to engage with and support device 150 (e.g., at least during operation of system 100). Member 186 may be any suitable mechanism or device for suspending and supporting any suitable computing device 150 as described herein. For example, member 185 may comprise a hinge that includes an axis of rotation such that device 150 may be rotated (e.g., by a user) about the axis of rotation to attain a desired angle for viewing display 152. In some examples, device 150 may permanently or semi-permanently attached to housing 182 of unit 180. In some examples, housing 180 and device 150 may be integrally or monolithically formed as a single unit.

Figure 4:
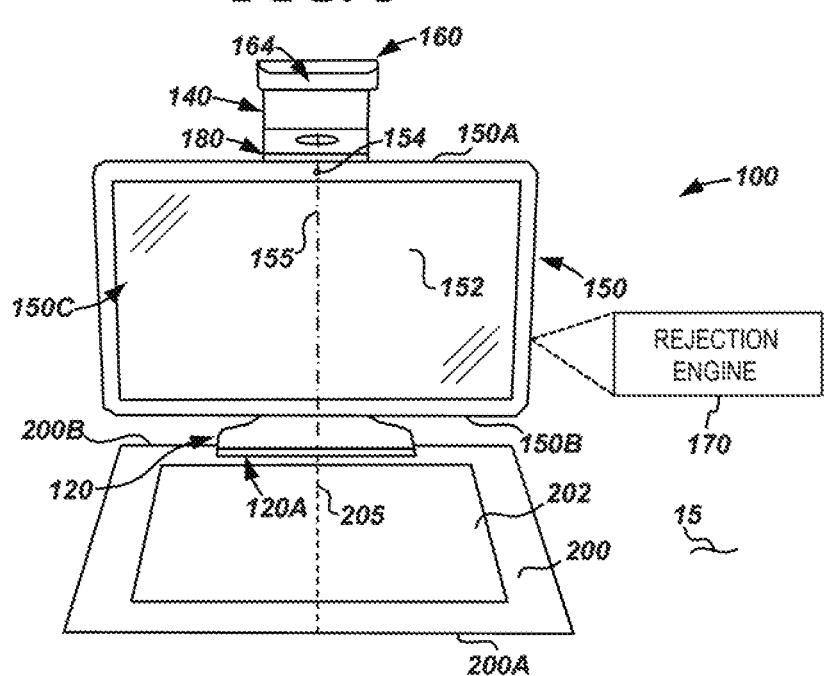
FIG. 4 is a schematic front view of the example computing system of FIG. 1.

Referring to FIG. 4, in some examples, when device 150 is suspended from structure 110 via mounting member 186 on housing 182, projector unit 180 (i.e., both housing 182 and assembly 184) may be substantially hidden behind device 150 when system 100 is viewed from the front (i.e., substantially facing display 152 disposed on front side 150C of device 150). In addition, as shown in FIG. 4, when device 150 is suspended from structure 110 as described above, projector unit 180 (i.e., both housing 182 and assembly 184) and any image projected thereby may be substantially aligned or centered with respect to center line 155 of device 150.

Referring again to FIG. 3, projector assembly 184 disposed within cavity 183 of housing 182, and includes a first or upper end 184A, a second or lower end 184B opposite the upper end 184A. Upper end 184A is proximate upper end 182A of housing 182 while lower end 184B is proximate lower end 182B of housing 182. Projector assembly 184 may comprise any suitable digital light projector assembly for receiving data from a computing device (e.g., device 150) and projecting image(s) (e.g., out of upper end 184A) that corresponds with that input data. For example, in some implementations, projector assembly 184 may comprise a digital light processing (DLP) projector or a liquid crystal on silicon (LCoS) projector which are advantageously compact and power efficient projection engines capable of multiple display resolutions and sizes, such as, for example, standard XGA resolution (1024×768 pixels) with a 4:3 aspect ratio, or standard WXGA resolution (1280×800 pixels) with a 16:10 aspect ratio. Projector assembly 184 is further communicatively connected (e.g., electrically coupled) to device 150 in order to receive data therefrom and to produce (e.g., project) fight and image(s) from end 184A based on the received data. Projector assembly 184 may be communicatively connected to device 150 via any suitable type of electrical coupling, for example, or any other suitable communication technology or mechanism described herein. In some examples, assembly 184 may be communicatively connected to device 150 via electrical conductor(s), WI-FI, BLUETOOTH, an optical connection, an ultrasonic connection, or a combination thereof. In the example of FIGS. 1-7A, device 150 is communicatively connected to assembly 184 through electrical leads or conductors (e.g., as described above in relation to surface 200 and base 120) disposed within mounting member 186 such that, when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 184. Mirror 162 includes a highly reflective surface 162A that is disposed along bottom surface 160D of top 160 and is positioned to reflect light, image(s), etc., projected from upper end 184A of projector assembly 184 toward surface 200 during operation. Mirror 162 may comprise any suitable type of mirror or reflective surface. In the example of FIGS. 1-7A, fold mirror 182 may comprise a standard front surface vacuum metalized aluminum coated glass mirror that acts to fold light emitted from assembly 184 down to surface 200. In other examples, mirror 162 may have a complex aspherical curvature to act as a reflective lens element to provide additional focusing power or optical correction.

Sensor bundle 164 includes at least one sensor (e.g., camera, or other type of sensor) to detect, measure, or otherwise acquire data based on state of (e.g., activities occurring in) a region between sensor bundle 164 and surface 200. The state of the region between sensor bundle 164 and surface 200 may include object(s) on or over surface 200, or activit(ies) occurring on or near surface 200. In the example of FIG. 3, bundle 164 includes an RGB camera 164A for another type of color camera 164A), an IR camera 164B, a depth camera (or depth sensor) 164C, and an ambient light sensor 164O. In examples described herein, a camera may be referred to as a "sensor".

In some examples, RGB camera 164A may be a camera to capture color images (e.g., at least one of still images and video). In some examples, RGB camera 164A may be a camera to capture images according to the RGB color model, which may be referred to herein as "RGB images". In some examples, RGB camera 164A may capture images with relatively high resolution, such as a resolution on the order of multiple megapixels (MPs), for example. As an example, RGB camera 164A may capture color (e.g., RGB) images with a resolution of 14 MPs. In other examples, RGB camera 164A may capture images with a different resolution. In some examples, RGB camera 164A may be pointed toward surface 200 and may capture image(s) of surface 200, object(s) disposed between surface 200 and RGB camera 164A (e.g., on or above surface 200), or a combination thereof.

IR camera 164B may be a camera to detect intensity of IR light at a plurality of points in the field of view of the camera 164B. In examples described herein, IR camera 164B may operate in conjunction with an IR light projector 166 (see FIG. 7A) of system 100 to capture IR images. In such examples, each IR image may comprise a plurality of pixels each representing an intensity of IR light detected at a point represented by the pixel. In some examples, top 160 of system 100 may include an IR light projector 166 (see FIG. 7A) to project IR light 167 toward surface 200 and IR camera 164B may be pointed toward surface 200. In such examples, IR camera 164B may detect the intensity of IR light reflected by surface 200, object(s) disposed between surface 200 and IR camera 164B (e.g., on or above surface 200), or a combination thereof. In some examples, IR camera 164B may exclusively detect IR light 167 projected by IR light projector 166 (e.g., as reflected from surface 200, object(s), etc or received directly).

Depth camera 164O may be a camera (sensor(s), etc.) to detect the respective distance(s) (or depth(s)) of portions of object(s) in the field of view of depth camera 164O. As used herein, the data detected by a depth camera may be referred to herein as "distance" or "depth" data. In examples described herein, depth camera 164C may capture a multi-pixel depth image (e.g., a depth map), wherein the data of each pixel represents the distance or depth (measured from camera 164O) of a portion of an object at a point represented by the pixel. Depth camera 164C may be implemented using any suitable technology, such as stereovision camera(s), single IR camera sensor with a uniform flood of IR light, a dual IR camera sensor with a uniform flood of IR tight, structured light depth sensor technology, time-of-flight (TOF) depth sensor technology, or a combination thereof. In some examples, depth sensor 164C may indicate when an object (e.g., a three-dimensional object) is on surface 200. In some examples, depth sensor 164C may detect at least one of the presence, shape, contours, motion, and the respective distance(s) of an object (or portions thereof) placed on surface 200.

Ambient light sensor 164D may be arranged to measure the intensity of light in the environment surrounding system 100. In some examples, system 100 may use the measurements of sensor 164D to adjust other components of system 100, such as, for example, exposure settings of sensors or cameras of system 100 (e.g., cameras 164A-164C), the intensity of the light emitted from light sources of system 100 (e.g., projector assembly 184, display 152, etc.), or the like.

In some examples, sensor bundle 164 may omit at least one of sensors 164A-164D. In other examples, sensor bundle 164 may comprise other camera(s), sensor(s), or the like in addition to sensors 164A-164D, or in lieu of at least one of sensors 164A-164D. For example, sensor bundle 164 may include a user interface sensor comprising any suitable device(s) sensor(s), camera(s)) for tracking a user input device such as, for example, a hand, stylus, pointing device, etc. In some examples, the user interlace sensor may include a pair of cameras which are arranged to stereoscopically track the location of a user input device (e.g., a stylus) as it is moved by a user about the surface 200 (e.g., about region 202 of surface 200). In other examples, the user interface sensor may additionally or alternatively include IR camera(s) or sensor(s) arranged to detect infrared light that is either emitted or reflected by a user input device. In some examples, sensor bundle 164 may include a gesture camera to detect the performance of predefined gestures by object(s) (e.g., hands, etc.). In some examples, the gesture camera may comprise a depth camera and additional functionality to detect, track, etc., different types of motion over time.

In examples described herein, each of sensors 164A-164D of bundle 164 is communicatively connected (e.g., coupled) to device 150 such that data generated within bundle 164 (e.g., images captured by the cameras) may be provided to device 150, and device 150 may provide commands to the sensor(s) and camera(s) of sensor bundle 164. Sensors 164A-164D of bundle 164 may be communicatively connected to device 150 via any suitable wired or wireless communication technology or mechanism, examples of which are described above. In the example of FIGS. 1-7A, electrical conductors may be routed from bundle 164, through top 160, upright member 140, and projector unit 180 and into device 150 through leads that are disposed within mounting member 186 (as described above).

Figure 5:
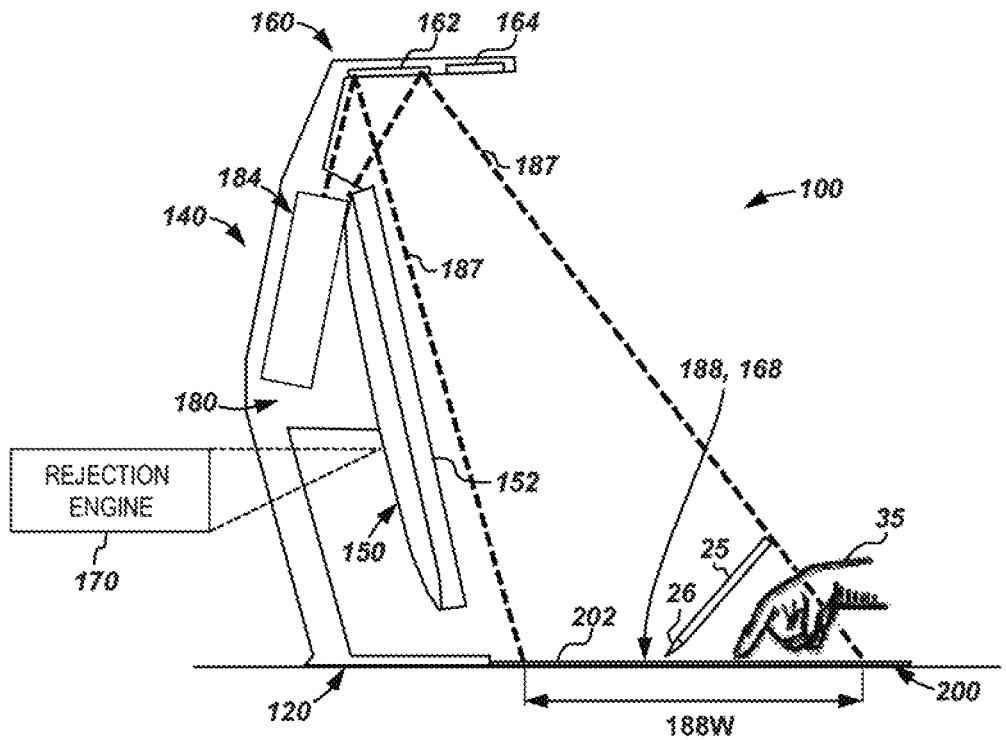
FIG. 5 is a schematic side view of the example computing system of FIG. 1 during an example operation.
Figure 6:
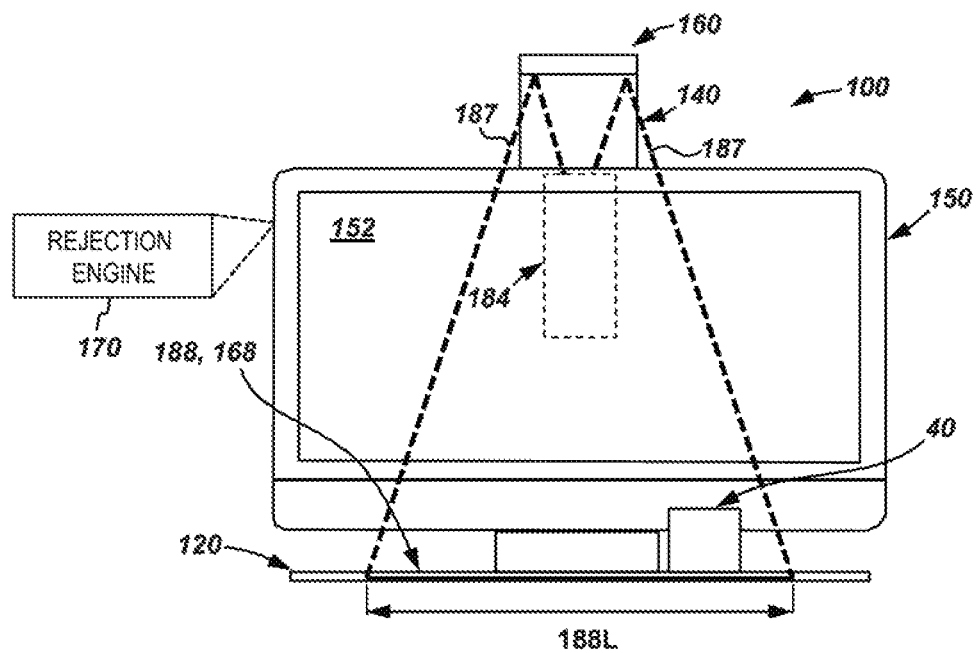
FIG. 6 is a schematic front view of the example computing system of FIG. 1 during another example operation.

Referring to FIGS. 5 and 6, during operation of system 100, projector assembly 184 may project visible light 187 to reflect off of mirror 162 towards surface 200 to thereby display visible image(s) on a projector display space 188 of surface 200. In the example of FIGS. 5-6, space 186 may be substantially rectangular, having a length 188L and a width 188W. In some examples, length 188L may be approximately 16 inches, while width 188W may be approximately 12 inches. In other examples, length 188L and width 188W may have different values.

In some examples, cameras of sensor bundle 164 (e.g., cameras 164A-164C) are arranged within system 100 such that the field of view of each of the cameras includes a space 168 of surface 200 that may overlap with some or all of display space 188, or may be coterminous with display space 188. In examples described herein, the field of view of the cameras of sensor bundle 164 (e.g., cameras 164A-164C) may be said to include space 168, though at times surface 200 may be at least partially occluded by object(s) on or over surface 200. In such examples, the object(s) on or over surface 200 may be in the field of view of at least one of cameras 164A-164C. In such examples, sensors of sensor bundle 164 may acquire data based on the state of (e.g., activities occurring in, object(s) disposed in) a region between sensor bundle 164 and space 168 of surface 200. In some examples, both space 188 and space 168 coincide or correspond with region 202 of surface 200 such that functionalities of touch-sensitive region 202, projector assembly 184, and sensor bundle 164 are ail performed in relation to the same defined area. A field of view 165 of the cameras of sensor bundle 164 (e.g., cameras 164A-164C) is schematically illustrated in FIG. 7A. In some examples, each of the cameras of sensor bundle 164 (e.g., cameras 164A-164C) may have a slightly different field of view.

Referring now to FIGS. 5-7A, device. 150 may direct projector assembly 184 to project image(s) onto surface 200 (e.g., onto region 202). Device 150 may also display image(s) on display 152 (which may be the same as or different than the image(s) projected onto region 202 by projector assembly 184). The image(s) projected by assembly 184 may comprise information and/or images produced by software being executed by device 150. In some examples, a user may interact with the image(s) projected on surface 200 and displayed on display 152 by physically engaging touch-sensitive surface 200 in any suitable manner, such as with user's hand 35 (e.g., via touches, taps, gestures, or other touch input), with a stylus 25, or via any other suitable user input device(s). As described above, touch-sensitive surface 200 may detect such interaction via physical engagement with surface 200. Also, in some examples, assembly 184 may also project image(s) (at least partially) on objects disposed over surface 200 (e.g., hand 35, as shown in FIG. 5).

As an example, when a user interacts with touch-sensitive surface 200 via physical contact (e.g., with a hand 35, as shown in FIG. 7A), surface 200 may generate touch input information and provide it to device 150 through any suitable connection (examples of which are described above). In some examples, the touch input information may be provided to rejection engine 170 (or an application or service implemented by rejection engine 170) which may reject the touch input (as described herein), or pass the touch input to an operating system (OS) executing on device 150. In some examples, the OS may pass the received touch input to another application (e.g., program, etc.) executing on device 150. In response, the executing OS or application may alter image(s) projected by projector assembly 184, image(s) displayed on display 152, or a combination thereof. As used herein, an "application", "computer application", or "service" is a collection of machine-readable instructions that are executable by a processing resource. In some examples, a user may similarly interact with image(s) displayed on display 152 (which may be a touch-sensitive display), or any other input device of device 150 (e.g., a keyboard, mouse, etc.).

In some examples, sensors (e.g., cameras) of sensor bundle 164 may also generate system input which may be provided to device 150 for further processing. For example, system 100 may utilize camera(s) of bundle 164 to detect at least one of the presence and location of a user's hand 35 (or a stylus 25, as shown in FIG. 5), and provide system input information representing the detected information to device 150. The provided system input information may be passed to at least one of an OS and application being executed by device 150, and may alter image(s) displayed by system 100, as described above in relation to touch input. For example, bundle 164 may include a pair of cameras or sensors that are arranged to perform stereoscopic stylus tracking (e.g., of stylus 25). In other examples, stylus 25 includes a tip 26 coated with an infrared retro-reflective coating (e.g., paint)

such that tip 26 may serve as an infrared retro-reflector. In such examples, bundle 164 may include IR camera(s) (or sensor(s)), as described above, which detect IR light that is reflected off of tip 26 to enable device 150 to track the location of tip 26 as it moves across region 202. In some examples, surface 200 (with image(s) projected on it by assembly 184) may serve as a second or alternative touch-sensitive display within system 100. In addition, detection of interaction with image(s) displayed on surface 200 may be enhanced through use of sensors of sensor bundle 164 as described above.

In some examples, system 100 may capture two-dimensional (2D) image(s) or create a three-dimensional (3D) scan of a physical object such that an image of the object may then be projected onto surface 200 for further use and manipulation thereof. For example, as shown in FIG. 6, an object 40 may be placed on surface 200 such that sensors of bundle 164 (e.g., at least one of cameras 164A-164C) may detect at least one of the location, dimensions, and color of object 40, to enhance the 2D image(s) or create the 3D scan thereof. In such examples, the information gathered by the sensors of bundle 164 may be provided to device 150 (e.g., an OS, application, service, etc., of device 150), as described above. In some examples, after receiving the information, device 150 (e.g., the OS, application, service, etc.) may direct projector assembly 184 to project an image of object 40 onto surface 200. Object 40 may be, for example, a smartphone, a book, a document, a photo, or any other physical object. In some examples, once object(s) are scanned by sensors of bundle 164, the background of the image representing the object may be removed (e.g., via a segmentation process as described below), and the resulting image of the foreground object may be projected onto surface 200 (or shown on display 152). In such examples, images of physical objects (e.g., an object 40) may be captured, processed, and displayed on surface 200 to quickly and easily create a digital version of the physical object to allow for further manipulation thereof.

FIG. 7B is a block diagram of a portion of computing system 100 of FIG. 1 comprising rejection engine 170. In particular, FIG. 7B illustrates an example of computing device 150 that comprises rejection engine 170 and is communicatively connected to at least one camera (e.g., camera 164A) of sensor bundle 164 (as described above) and touch-sensitive surface 200, as described above. Although not shown in FIG. 7S, computing device 150 may also be communicatively connected to other components of system 100, as described above.

Computing device 150 (or any other computing device implementing rejection engine 170) may include at least one processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

As noted above, in the example of FIG. 7B, computing device 150 comprises rejection engine 170. In other examples, rejection engine 170 may comprise additional engine(s). In the example of FIG. 7D, for example, rejection engine 170 comprises a segmentation engine 172 and an identification engine 174. In some examples, engine 170 may include additional engine(s) In examples described herein, any engine(s) of computing device 150 (e.g., engines 170, 172, 174, etc.) may be any combination of hardware and programming to implement the functionalities of the respective engine. Such combinations of hardware and programming may be implemented in a number of different ways. For example, the programming may be processor executable instructions stored on a non-transitory machine-readable storage medium and the hardware may include a processing resource to execute those instructions. In such examples, the machine-readable storage medium may store instructions that, when executed by the processing resource, implement the engines. The machine-readable storage medium storing the instructions may be integrated in the same computing device (e.g., device 150) as the processing resource to execute the instructions, or the machine-readable storage medium may be separate from but accessible to the computing device and the processing resource. The processing resource may comprise one processor or multiple processors included in a single computing device or distributed across multiple computing devices.

In some examples, the instructions can be part of an installation package that, when installed, can be executed by the processing resource to implement the engines of system 100. In such examples, the machine-readable storage medium may be a portable medium, such as a compact disc, DVD, or flash drive, or a memory maintained by a server from which the installation package can be downloaded and installed. In other examples, the instructions may be part of an application or applications already installed on a computing device including the processing resource (e.g., device 150). In such examples, the machine-readable storage medium may include memory such as a hard drive, solid state drive, or the like.

As used herein, a "machine-readable storage medium" may be any electronic, magnetic, optical, or other physical storage apparatus to contain or store information such as executable instructions, data, and the like. For example, any machine-readable storage medium described herein may be any of a storage drive (e.g., a hard drive), flash memory, Random Access Memory (RAM), any type of storage disc (e.g., a compact disc, DVD, etc.), and the like, or a combination thereof. Further, any machine-readable storage medium described herein may be non-transitory.

Examples of rejection engine 170 are described below in relation to FIGS. 7A-7F. Referring to FIGS. 7A-7C, computing system 100 comprises touch-sensitive surface 200 to detect touch input at locations of touch-sensitive, surface 200, as described above. As used herein, a "touch input" may be at least one physical contact (or other physical interaction) between a touch-sensitive surface and an object (e.g., a finger, stylus, etc.) that may be detected by the surface. In the example of FIG. 7A-7C, the touch input may be provided by physical contact between a hand 35 and surface 200. In other examples, the touch input maybe provided by contact by any other suitable object 35.

As described above, computing system 100 may comprise sensor bundle 164 including at least one camera 164A pointed at touch-sensitive, surface 200. In the example of FIG. 7B, computing device 100 includes camera 164A (e.g., RGB camera 164A) pointed at surface 200 (as shown in FIG. 7A). Camera 164A may capture an image 700 representing object 35 (e.g., a hand) disposed between camera 164A and touch-sensitive surface 200. An example image 700 is illustrated in FIG. 7C, in which image 700 includes an object representation 710, which may be a portion of image 700 representing object 35, and a background representation 715, which may be a portion of image 700 representing surface 200. Although FIG. 7C illustrates an example image 700 captured while hand 35 is open, in other examples camera 164A may capture an image of hand 35 held in any other manner (e.g., while pointing a finger, as shown in FIG. 7A).

In the example of FIGS. 7A-7C, rejection engine 170 may identify at least one target touch region of the touch-sensitive surface, wherein each identified target touch region is for receiving touch input. As used herein, a "target touch region" of a touch-sensitive surface of a computing system may be a region including less than all of the surface and from which the computing system may accept touch input detected by the surface. In examples described herein, rejection engine 170 may identify target touch regions based on at least one characteristic (e.g., location, position, orientation, shape, etc.) of the object represented in at least one image captured by at least one camera pointed at surface 200, such as camera 164A. For example, engine 170 may identify a region of touch-sensitive surface 200 that, based on an image of an object disposed over surface 200, is in close proximity to a portion of the object associated with intended touch input. For example, when the object is a hand, the fingertips of the hand may be considered portions of the object associated with intended touch input. In some examples, a region in close proximity to a portion of an object associated with intended touch input may be defined to include locations within a threshold distance of the detected position of the portion of the object itself. For example, where the target touch region is based on a fingertip, the target touch region may be identified as a circle with a radius of 5 mm centered on the fingertip, or the like. In other examples, the region may be a different size, shape, or the like.

As an example, referring to image 700 of FIG. 7C, the object 35 represented in the image may be a hand 35 (represented by object representation 710). In such examples, engine 170 may identify, as a target touch region 720, a region of surface 200 that is in close proximity to a forefinger of hand 35, which may be associated with intended touch input. In such examples, the target touch region identified by engine 170 may exclude other regions of surface 200 that are in close proximity (e.g., directly beneath) other portions of the object 35 that are not associated with intended touch input. For example, the target touch region 720 associated with the forefinger may exclude the region of surface 200 in close proximity to the palm of hand 35 (e.g., a non-target touch region 725 of FIG. 7C), as the palm may be associated with unintended accidental) touch input. In some examples, engine 170 may identify a plurality of target touch regions of surface 200. For example, as shown in FIG. 7C, engine 170 may identify a plurality of target touch regions 720, each being a region of surface 200 in close proximity to (e.g., within a relatively small threshold distance of) a tip of a respective finger of hand 35 (e.g., including the thumb).

In some examples, any region of surface 200 that is not within a target touch region identified by engine 170 may be considered a non-target touch region from which detected touch input is to be rejected, as described below. For example, as illustrated in FIG. 7C, surface 200 includes a non-target touch region 725 that includes locations of surface 200 in close proximity (e.g., directly beneath) the palm of hand 35. Although an example non-target touch region 725 is shown in FIG. 7C, in some examples, the non-target touch region may include region 725 as well as all other areas of surface 200 not contained in at least one target touch regions 720. In examples described herein, each target touch region of surface 200 identified by engine 170 may be smaller than the full area of surface 200. In the example of FIG. 7C, each identified target touch region 720 includes a respective region of touch-sensitive surface 200 over which a respective fingertip of hand 35 is disposed and excludes another region of surface 200 over which a palm of hand 35 is disposed (e.g., a region 725).

In the example of FIGS. 7A-7B, rejection engine 170 may determine whether the location of a touch input detected by surface 200 is within any of the identified target touch region(s) of surface 200. In such examples, rejection engine 170 may reject a detected touch input in response to a determination that the location of the detected touch input is net within any of the identified target touch region(s). For example, surface 200 may detect a touch input at a location 194 of surface 200, as illustrated in FIG. 7C, and engine 170 may identify target touch regions 720, as described above. In such examples, engine 170 may determine that location 194 of the detected touch input is not within any of the identified target touch regions 720, and may reject the detected touch input in response to the determination. For example, as shown in FIG. 7C, the location 194 of the touch input may be a location of surface 200 over which the palm of hand 35 is disposed. In such examples in which the location 194 of the touch input is in a region of surface 200 over which the palm is disposed, rejection engine 170 may reject the detected touch input in response to a determination that the location 194 of the detected touch input is not within any of the identified target touch regions 720 of surface 200.

In examples described herein, to reject a given touch input, rejection engine 170 may, for example, handle the given touch input such that it has no effect on any application(s), service(s), OS function(s), or other aspect(s) of computing system 100 outside of rejection engine 170. For example, engine 170 may reject the given touch input by not providing the given touch input (i.e., information describing the given touch input) to any other component of computing system 100, such as an OS of computing device 150.

Rejection engine 170 may accept a detected touch input in response to a determination that the location of the detected touch input is within any of the identified target touch region(s). For example, surface 200 may detect a touch input at a location 192 of surface 200, as illustrated in FIG. 7C, and engine 170 may identify target touch regions 720, as described above. In such examples, engine 170 may determine that location 192 of the detected touch input is within one of the identified target touch regions 720, and may accept the detected touch input in response to the determination.

In examples described herein, to accept a given touch input, rejection engine 170 may pass the given touch input (i.e., information describing the given touch input) to a touch input processing function of computing device 150, which may be included in an OS or other application being executed by computing device 150, such that the given touch input may have an effect on application(s), service(s), and/or other aspect(s) of computing system 100 outside of rejection engine 170.

FIG. 7D is a block diagram of another example of a portion of computing system 100. In the example of FIG. 7D, system 100 comprises computing device 150 including rejection engine 170 and communicatively connected to touch-sensitive surface 200, as described above in relation to FIG. 7B. In the example of FIG. 7D, may also be communicatively connected to cameras 164A-164C of sensor bundle 164, and rejection engine 170 may comprise engines 172 and 174.

As described above in relation to FIGS. 7A-7C, touch-sensitive surface 200 may detect a touch input at a location of surface 200, and at least one camera of bundle 164, pointed at surface 200, may capture image(s) representing an object disposed between the camera(s) and surface 200. In the example of FIG. 7D, segmentation engine 172 may identify a segmentation boundary at least partially representing an outer edge of object 35 based on the captured image(s). In such examples, identification engine 174 of engine 170 may identify at least one target touch region of surface 200 based on characteristic(s) of object 35 corresponding to the segmentation boundary, such as, for example, the shape, orientation, position(s), location(s), etc., of object 35 or portions thereof. For example, in examples in which object 35 is a hand, the characteristics utilized by engine 174 to identify target touch region(s) may include fingertip location(s), palm location(s), etc.

In some examples, segmentation engine 172 may perform a process on a captured image to extract an image of at least one foreground object represented in the captured image. This process may be referred to herein as "segmentation". In some examples, the result of such a segmentation process may be an image of the foreground object separated from at least a background represented in the captured image. In some examples, a segmentation process may comprise determining a segmentation boundary for an object represented in a captured image. As used herein, a "segmentation boundary" for an object represented in an image may be information representing an estimate of which portion(s) of the image represent the object and which portion(s) of the image represent features other than the object (e.g., a background). In some examples, a segmentation boundary for an object represented in an image may include information representing at least one outer edge of the object as represented in the image. When performing a segmentation process, a computing system may use the segmentation boundary to extract an image of the object from a larger captured image (e.g., also representing portions of a background).

In some examples, segmentation engine 172 may determine a segmentation boundary based on an image captured with a camera of sensor bundle 164. For example, engine 172 may determine a segmentation boundary for object 35 based on image 700 captured with camera 164A. In some examples, computing device 150 may use the determined segmentation boundary to extract an image of object 35 from captured image 700 representing more than object 35. The resulting segmented image may be the portion of image 700 representing object 35 (e.g., representation 710) with the portions of image 700 representing other feature(s) (e.g., background representation 715) subtracted out. In such examples, the resulting segmented image may correspond to object representation 710. In examples described herein, a segmentation boundary may be represented in any suitable form, format, data structure, or the like. For example, segmentation boundary may be represented as a binary mask indicating, for each pixel of at least one corresponding image (e.g., image 700), whether the pixel represents a portion of the object or not. As an example, engine 172 may run a gradient filter over captured image 700 to detect portions of the image having relatively high gradient magnitudes to estimate at least the edge(s) of object 35.

In some examples, identification engine 174 of engine 170 may identify at least one target touch region of surface 200 based on character of object 35 corresponding to the segmentation boundary, such as, for example, shape, orientation, position(s), location(s), etc., of object 35 or portions thereof. In examples described herein, an object "corresponding to" a segmentation boundary may be the object whose outer edge(s) are represented by the segmentation boundary.

In examples in which the object corresponding to the segmentation boundary is a hand, identification engine 174 may identify target touch region(s) in close proximity to respective fingertip(s) of the hand, as described above. In such examples, engine 174 may extract a skeletal model of the hand based on the portion of the captured image representing the hand (e.g., the portion of the image corresponding to and extracted based on the determined segmentation boundary). In such examples, engine 174 may extract the skeletal model of the hand using, for example, a heuristic-based approach, a medial axis transform (MAT), a mesh contraction, a tree-structure extraction algorithm, extraction of a Euclidian skeleton based on a connectivity criterion, or any other suitable technique. Engine 174 may use the extracted skeletal model to determine the location(s) of the fingertips relative to the touch-sensitive surface 200 and identify respective region(s), each within a relatively small threshold distance of one of the fingertips, as target touch region(s) of surface 200 (see, e.g., regions 720 of FIG. 7C). In examples described herein, rejection engine 170 may correlate areas of image(s) captured by camera(s) of sensor bundle 164 to locations of surface 200 such that target touch region(s) of surface 200 may be identified based on image(s) captured by the camera(s).

In other examples, in which the object is not a hand, identification engine 174 may identify target touch region(s) differently. For example, the object may be a stylus 25 having a tip 26, as shown in FIG. 5. In such examples, a camera of sensor bundle 164 may capture an image 702 (see FIG. 7E) representing the stylus 25 disposed between the camera and surface 200. In such examples, image 702 may include an object representation 712 (representing stylus 25) and a background representation 714 (representing surface 200 and a hand holding the stylus). In such examples, engine 172 may segment at least a portion of object representation 712 from image 702 and engine 174 may identify a target touch region 730 of surface 200 including locations in close proximity to (e.g., within a threshold distance of) the location of tip 26. In such examples, all other regions of surface 200 may be considered non-target touch regions, including, for example, a non-target touch region 735 of surface 200 over which a palm of the hand holding stylus 25 is disposed.

In still other examples, identification engine 174 may identify non-target touch region(s) based on characteristic(s) of an object in an image captured by a camera of sensor bundle 164. For example, a physical object 40 may be placed on surface 200, as shown in FIG. 6. In such examples, a camera of sensor bundle 164 may capture an image 704 (see FIG. 7F) representing the object 40 disposed between the camera and surface 200. In such examples, image 704 may include an object representation 710 (representing object 40) and a background representation 718 (representing surface 200). In such examples, engine 172 may segment object representation 716 from image 704 and engine 174 may identify a non-target touch region 745 of surface 200 including locations including and closely surrounding (e.g., within a threshold distance of) location(s) of object 40 relative to surface 200. In such examples, locations closely surrounding object 40 may be identified as a non-target touch region 745 to reject unintended touch input that may be detected when a hand interacts with (e.g., picks up) object 40.

As described above, computing system 100 may comprise a plurality of different types of cameras in sensor bundle 164. In some examples, computing system 100 may utilize the cameras of different types to capture a plurality of images, each representing an object disposed between touch-sensitive surface 200 and the respective camera used to capture the image. In some examples, each of the plurality of cameras may be a different one of an RGB camera 164A, an IR camera 164B, a depth camera 164C, and gesture camera, as described above.

For example, as shown in FIG. 7D, computing system 100 may comprise computing device 150 communicatively connected to each of RGB camera 164A, IR camera 164B, depth camera 164C, and touch-sensitive surface 200. In such examples, each of cameras 164A-164C may be pointed at surface 200 and may capture a respective image representing an object disposed between the respective camera and surface 200.

In such examples, segmentation engine 172 may identify the segmentation boundary for the object based on each of the plurality of images. In some examples, cameras 164A-164C may be at different physical locations. As such, cameras 164A-164C may capture respective images of the same scene (e.g., viewing surface 200 from above) from slightly different angles. In such examples, rejection engine 170 may geometrically align the respective images of the object captured by cameras 164A-164C. For example, rejection engine 170 may construct at least one homography (or other mapping(s)) for the pixels of cameras 164A-164C such that pixels corresponding to the same image features (e.g., object 35) may be identified in each of the images. The homography or other mapping may be determined in any suitable manner. In some examples, rejection engine 170 may map the pixels of each of the images to a common set of coordinates to geometrically align the images. In some examples, the engine 170 may also map locations of surface 200 to the common set of coordinates, or otherwise correlate locations of surface 200 to the pixels of the captured images. In some examples, engine 170 may perform such geometric alignment prior to performing other functionalities of a segmentation process.

In some examples, segmentation engine 172 may determine the segmentation boundary far the object represented in the image as described above, but based on the data in each of the captured images, rather than the data of one image, as described above. Engine 172 may utilize the data of each of the images together in any suitable manner to determine the segmentation boundary. For example, engine 172 may run a gradient filter over the data of each of the captured images to detect relatively high gradient magnitudes to estimate the locations of edge(s) of the object. For example, engine 172 may estimate that a given location (e.g., of the common coordinates) represents an edge of the object if the data from any of the images suggests (or otherwise indicates) the presence of an edge. In other examples, engine 172 may not estimate that a given location represents an edge of the object unless more than one (or all) of the images suggest (or otherwise indicate) the presence of an edge. In some examples, engine 72 may additionally or alternatively utilize various heuristic(s), rule(s), or the like, for estimating the presence of edges of an object based on the data of each of the captured images. In some examples, engine 172 may apply different weights to the data of the different images and may identify edge locations (and thus a segmentation boundary) based on the weighted data from each of the captured images. Additionally, in some examples, engine 172 may determine the segmentation boundary for the object alter surface 200 detects a touch input. In such examples, engine 172 may determine the segmentation boundary based on portions of each of the images that correspond to a region of surface 200 in the vicinity of the detected touch input and that includes less than all of surface 200.

In some examples, it may be difficult to accurately determine a segmentation boundary for an object based on an image captured by a single camera, as certain conditions may make it difficult to accurately distinguish the foreground object from the background in the image. For example, it may be difficult to accurately determine a segmentation boundary based on an image captured by a odor camera (e.g., an RGB camera) in the presence of shadows, or when the foreground object and the background are very similar in color. By using multiple images from cameras of different types, examples described herein may more accurately determine a segmentation boundary, as conditions affecting segmentation performed on images from one type of camera may not affect segmentation on images from camera of a different type. For example, an image captured by an IR camera may not be affected by either shadows or color similarity. In some examples, features and functionalities described herein in relation to FIGS. 1-7F may be provided in combination with features and functionalities described herein in relation to any of FIGS. 8-10.

Figure 8:
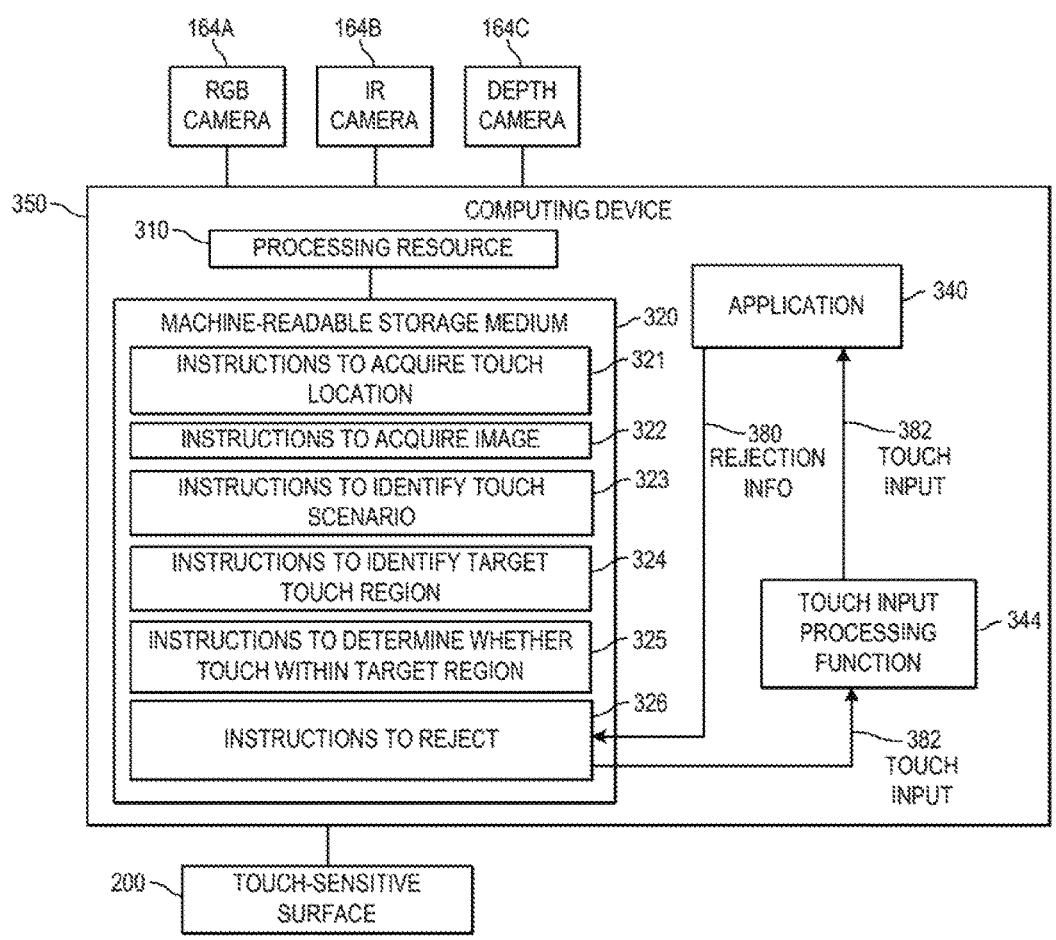
FIG. 8 is a block diagram of an example computing device to determine a target touch region.

FIG. 8 is a block diagram of another example computing device 350 to determine a target touch region. Computing device 350 may be another example implementation of device 150 described above in relation to FIGS. 1-7F. In the example of FIG. 8, computing device 350 is communicatively connected to touch-sensitive surface 200 and cameras 164A-164C, as described above). Each of cameras 164A-164C may be disposed above and pointed at surface 200. Computing device 350 may further include a processing resource 310 and a machine-readable storage medium 320 comprising (e.g., encoded with) instructions 321-326. In some examples, storage medium 320 may include additional instructions. In other examples, instructions 321-326 and any other instructions described herein in relation to storage medium 320, may be stored on a machine-readable storage medium remote from but accessible to computing device 350 and processing resource 310. Processing resource 310 may fetch, decode, and execute instructions stored on storage medium 320 to implement the functionalities described below. In other examples, the functionalities of any of the instructions of storage medium 320 may be implemented in the form of electronic circuitry, in the form of executable instructions encoded on a machine-readable storage medium, or a combination thereof. Machine-readable storage medium no may be a non-transitory machine-readable storage medium.

In the example of FIG. 3, instructions 321 may acquire, from touch-sensitive surface 200, a location of a touch input detected by surface 200. Instructions 322 may acquire, from at least one of cameras 164A-164C, at least one image representing an object disposed between the camera and surface 200. Instructions 323 may identify a current touch input scenario for computing system 100 among a plurality of different touch input scenarios for computing system 100. As used herein, a "touch input scenario" is a mode for providing touch input to a computing system via a touch-sensitive surface of the computing system. In examples described herein, touch input scenarios are different if a computing system is to handle touch input differently for each of the touch input scenarios (which may also be referred to herein as "distinct" touch input scenarios). In some examples, the plurality of different touch input scenarios for computing system 100 may include, for example, a hand input scenario, a stylus input scenario, an object input scenario, and a finger input scenario, as described below.

Instructions 324 may identify at least one target touch region of surface 200 based on at least a location of the object as represented in the captured image(s). In some examples, instructions 324 may identify the target touch region(s) based on any combination of characteristics (e.g., shape, orientation, etc.) of the object as represented in the captured image(s). Instructions 324 may identify the target touch input(s) differently for each touch input scenario of the plurality of touch input scenarios for computing system 100. For example, instructions 324 may identify the target touch input(s) differently when the hand input scenario is identified than when the stylus input scenario is identified. Instructions 325 may determine whether the location of the touch input detected by surface 200 is within any identified target touch region of surface 200. In response to a determination that the location of the touch input is not within any of the identified target touch region(s), instructions 325 may reject the touch input, as described above. In some examples, instructions 322 may geometrically align the captured image(s) and the locations of surface 200, as described above, prior to identifying the target touch regions.

In some examples, instructions 326 may further receive touch rejection information from at least one other component of computing system 100 and determine whether the received touch rejection information indicates that the detected touch input is to be rejected. For example, instructions 326 may receive touch rejection information 380 from an application 340 executed by computing device 350 of computing system 100. In some examples, application 340 may be an application in focus on at least one display of computing system 100, and information 380 may, in any suitable manner, indicate region(s) of surface 200 at which touch input may be received (e.g., corresponding to buttons, or other graphical user interface (GUI) features to receive input) and where touch input may not be received (e.g., portions of surface 200 not having any GUI feature to interact with). In such examples, instructions 326 may determine whether the received touch rejection information 380 indicates that the detected touch input is to be rejected by, for example, determining whether the location of the touch input is within a portion of surface 200 at which application 340 may receive touch input, as indicated by information 380.

If the touch input is in a region of surface 200 where application 340 may not receive touch input, instructions 326 may reject the touch input. For example, touch rejection information 380 may indicate at least one non-target touch region of surface 200, where application 340 may not receive touch input. In such examples, instructions 326 may reject the touch input in response to a determination that the location of the detected touch input is within the non-target touch region of surface 200 indicated by information 380. If the touch input is in a region of surface 200 where application 340 may receive touch input (as indicated by rejection information 328), instructions 326 may accept the touch input if it is also within en identified target touch region of surface 200 (and may reject the touch input otherwise).

In other example, instructions 326 may receive touch rejection information from other component(s) of computing system 100. For example, instructions 326 may receive touch rejection information from touch-sensitive surface 200, which may include information regarding characteristics of a detected touch input, which may be used to estimate whether the detected touch input was an intended touch input or was an unintended touch input (e.g., if the touch input was light or fleeting). In some examples, touch rejection information from surface 200 indicating a light or fleeting touch may indicate to instructions 326 that the detected touch input is to be rejected. In some examples, all of the touch rejection information received by instructions 326 may be used, along with the identified target touch region(s), to determine whether to reject a detected touch input. In some examples, the different touch rejection information received may be given different weights when determining whether to reject a detected touch input.

In some examples, in response to e determination that the location of the detected touch input is within an identified touch region of surface 200 and a determination that touch rejection information does not indicate that the detected touch input is to be rejected, then instructions 326 may provide the detected touch input 382 (i.e., information describing the touch input) to a touch input processing function 344 of computing system 100.

In examples described herein, touch input processing function 344 may be a functionality of computing device 350 to cause the detected touch input to have an effect on the operation of computing system 100. For example, function 344 may provide touch input 382 to application 340 such that the detected touch input 382 may affect the operation of application 340 (e.g., be utilized as input by application 340). In such examples, to reject a detected touch input, engine 170 may not provide any information describing the touch input to touch input processing function 344. Touch input processing function 344 may be, for example, at least one function of an OS of computing device 350, or at least one function of any other process, service, application, or the like, implemented by computing device 350. In examples described herein, touch input processing function 344 may be implemented on computing device 350 in the form of electronic circuitry, in the form of executable instructions encoded on a machine-readable storage medium, a combination of hardware and programming, or a combination thereof.

As noted above, instructions 323 may identify current touch input scenario for computing system 100. In examples described herein, instructions 323 may determine the touch input scenario based, at least in part, on the object disposed between sensor bundle 164 and surface 200. For example, the object may be a stylus 25, as illustrated in FIGS. 5 and 7E. In such examples, instructions 323 may identify a stylus input scenario as the current touch input scenario for computing system 100. In some examples, as described above, tip 26 of stylus 25 may be coated with an IR retro-reflective coating, the presence of which may be detected using IR camera 164B. In such examples, instructions 323 may identify the stylus input scenario as the current touch input scenario in response to detecting the presence of stylus 25 with IR camera 164B. In other examples, the stylus input scenario may be detected in any other suitable manner.

In response to identification of the stylus input scenario by instructions 323, instructions 324 may identify a location of a Up of the stylus relative to the surface, based on characteristic(s) of the object represented in the image, such as a location of the stylus tip as represented in the captured image (e.g., image 702 of FIG. 7E). Referring to FIG. 7E, in such examples, instructions 324 may identify a region of surface 200 that is in close proximity to the identified tip location as a target touch region 730 of surface 200. In such examples, the identified target touch region 730 may exclude locations of surface 200 (e.g., non-target touch region 735) disposed below a palm of a hand holding stylus 25. In some examples, instructions 324 may utilize an image captured by IR camera 164B to determine a location of the tip 26 of the stylus 25 relative to surface 200.

In other examples, the object may be a hand, as illustrated in FIGS. 5 and 7A. In some examples, the current touch input scenario may be identified as a finger input scenario where input is to be received from a pointed finger, as illustrated in FIG. 7A. In such examples, instructions 323 may receive an indication from an application (e.g., application 340) executing on computing device 350 that the finger input scenario is the current touch input scenario (e.g., when finger writing input is expected by the application). In such examples, a target touch region in close proximity to the pointed fingertip (and excluding surface 200 regions under the rest of the hand) may be identified.

In other examples when the object is a hand, instructions 323 may identify a hand input scenario as the current touch input scenario for computing system 100. In some examples, instructions 323 may identify the hand input scenario as the current touch input scenario as a default response to determining that the current touch input scenario is not any of the other possible touch input scenarios (e.g., those described above). In other examples, the hand input scenario may be detected in any other suitable manner. Referring to FIG. 7C, in response to identification of the hand input scenario by instructions 323, instructions 324 may identify a segmentation boundary at West partially representing an outer edge of the hand based on at least image representing the object captured by at least one camera of sensor bundle 164, and extract a skeletal model for the hand based on characteristics of the object hand) corresponding to the segmentation boundary, as described above. Instructions 324 may further identify respective locations of the fingertips of the hand relative to surface 200, based on the skeletal model, and for each of the identified fingertip locations, identify, as a target touch region 720, a region of locations of surface 200 that are in close proximity to the identified fingertip location. In such examples, instructions 324 may identify the target touch regions 720 such each of the identified target touch regions 702 excludes locations of surface 200 disposed below the palm of the hand (e.g., locations of non-target touch region 725).

In some examples, instructions 321 may detect a trigger to initiate a touch rejection process to accept or reject a detected touch input, as described above. For example, detecting touch input may trigger the touch rejection process. In other examples, the touch rejection process may be triggered by an application (e.g., application 340) being executed by computing device 350, a user input (e.g., requesting the process), or the like. In other examples, the touch rejection process may be continually performed by computing system 100. In some examples, camera(s) of sensor bundle 164 may capture respective image(s) of the object in response to the touch rejection process being triggered (e.g., by a detected touch), or may be captured periodically in preparation to use such image(s) in a touch rejection process. In examples in which the image(s) are captured before the trigger, the trigger may initiate the rest of the touch rejection process described above after the capturing of the images. In some examples, features and functionalities described herein in relation to FIG. 8 may be provided in combination with features and functionalities described herein in relation to any of FIGS. 1-7F and 9-10.

Figure 9:
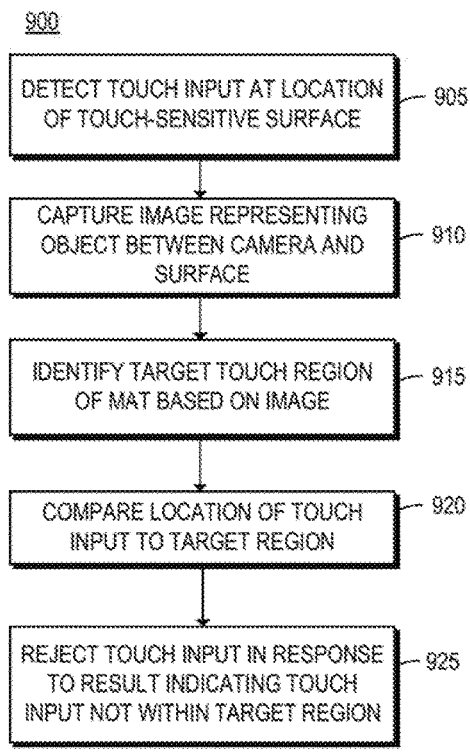
FIG. 9 is a flowchart of an example method for rejecting touch input.

FIG. 9 is a flowchart of an example method 900 for rejecting touch input. Although execution of method 900 is described below with reference to computing system 100 of FIGS. 1-7B and 7D, other suitable systems for execution of method 900 can be utilized (e.g., system 100 with computing device 350). Additionally, implementation of method 900 is not limited to such examples.

At 905 of method 900, touch-sensitive surface 200 of computer system 100 may detect a touch input at a location of surface 200. At 910, at least one camera of computer system 100 disposed above and pointed at surface 200 may capture at least one image representing an object disposed between the camera and surface 200. At 915, a rejection engine 170 of computing device 150 of computing system 100 may identify at least one target touch region of touch-sensitive surface 200, based on at least one characteristic of the object represented in the image(s), wherein each identified target touch region includes a respective region of the surface over which a respective target portion of the object is disposed and excludes another region of the surface over which a non-target portion of the object is disposed. At 920, engine 170 may compare the location of the touch input to at least one identified target touch region of the surface. For example, engine 170 may compare the location to successive ones of the identified target touch region(s) until it is determined that the location is within one of the target touch regions, or is not within any of the target touch region(s). At 925, in response to a comparison result indicating that the location of the touch input is not within any of the identified target touch region(s), engine 170 may reject the detected touch input.

Although the flowchart of FIG. 9 shows a specific order of performance of certain functionalities, method 900 is not limited to that order. For example, the functionalities shown in succession in the flowchart may be performed in a different order, may be executed concurrently or with partial concurrence, or a combination thereof. In some examples, features and functionalities described herein in relation to FIG. 9 may be provided in combination with features and functionalities described herein in relation to any of FIGS. 1-8 and 10.

Figure 10:
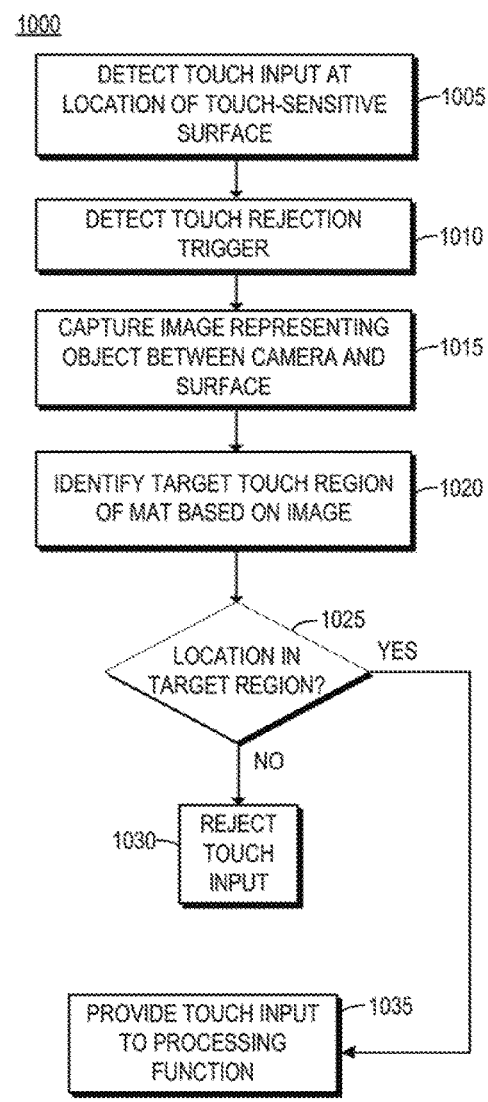
FIG. 10 is a flowchart of an example method four identifying a target touch region.

FIG. 10 is a flowchart of an example method 1000 for identifying a target touch region. Although execution of method 1000 is described below with reference to computing system 100 of FIGS. 1-7B and 7D, other suitable systems for execution of method 1000 can be utilized (e.g., system 100 with computing device 350). Additionally, implementation of method 1000 is not limited to such examples.

At 1005 of method 1000, touch-sensitive surface 200 of computer system 100 may detect a touch input at a location of surface 200. At 1010, rejection engine 170 may detect a trigger to initiate a touch rejection process, which may be generated in response to appropriate condition(s) in computing system 100, as described above. At 1015, in response to the detection of the trigger, at least one camera of computer system 100 disposed above and pointed at surface 200 may capture at least one image representing an object disposed between the camera and surface 200. At 1020, rejection engine 170 of computing device 150 of computing system 100 may identify at least one target touch region of touch-sensitive surface 200, based on at least one characteristic of the object represented in the image(s), wherein each identified target touch region includes a respective region of the surface over which a respective target portion of the object is disposed and excludes another region of the surface over which a non-target portion of the object is disposed. In some examples, the object may be a hand. In such examples, each target portion of the object may be a respective fingertip of the hand, and the non-target portion of the object may comprise a palm of the hand.

At 1025, engine 170 may compare the location of the touch input to at least one identified target touch region of the surface. In response to a comparison result indicating that the location of the touch input is not within any of the identified target touch region(s), method 1000 may proceed to 1030 where engine 170 may reject the detected touch input. In response to a comparison result at 1025 indicating that the location is within one of the identified target touch region(s), method 1000 may proceed to 1035 where engine 170 may provide the detected touch input to a touch input processing function of computing system 100.

Although the flowchart of FIG. 10 shows a spelt order of performance of certain functionalities, method 1000 is not limited to that order. For example, the functionalities shown in succession in the flowchart may be performed in a different order, may be executed concurrently or with partial concurrence, or a combination thereof. In some examples, features and functionalities described herein in relation to FIG. 10 may be provided in combination with features and functionalities described herein in relation to any of FIGS. 1-9.

What is claimed is:

1. A computing system comprising:
   a camera to capture an image representing an object disposed between the camera and a touch-sensitive surface, the touch-sensitive surface to detect a touch input at a location of the touch-sensitive surface;
   a processor; and
   a non-transitory storage medium storing instructions executable on the processor to:
   identify, based on a characteristic of the object represented in the image, a target touch region of the touch-sensitive surface, the target touch region for receiving touch input, wherein the identifying of the target touch region comprises determining that a first region of the touch-sensitive surface is within a threshold distance from a target portion of the object, determining that a second region of the touch-sensitive surface is outside the threshold distance from the target portion of the object, and including the first region in the target touch region and excluding the second region from the target touch region,
   determine that the location of the detected touch input is not within the identified target touch region of the touch-sensitive surface, and
   reject the detected touch input in response to the determining.

2. The computing system of claim 1, wherein the instructions are executable on the processor to:
   identify a segmentation boundary at least partially representing an outer edge of the object based on the image, wherein the identifying of the target touch region of the touch-sensitive surface is based on the characteristic of the object corresponding to the segmentation boundary.

3. The computing system of claim 2, comprising:
   a plurality of cameras of different types to capture a plurality of images, each respective image of the plurality of images captured by a respective camera of the plurality of cameras and representing the object disposed between the touch-sensitive surface and the respective camera,
   wherein the identifying of the segmentation boundary is based on each of the plurality of images; and
   wherein the plurality of cameras includes the camera and the plurality of images includes the image.

4. The computing system of claim 3, wherein:
   each of the plurality of cameras is a different one of an RGB camera, an infrared (IR) camera, a depth camera, and a gesture camera, and
   the identified target touch region of the touch-sensitive surface is smaller than the full area of the touch-sensitive surface.

5. The computing system of claim 1, wherein:
   the object is a hand, and
   the identified target touch region includes a respective region of the touch-sensitive surface over which a fingertip of the hand is disposed and excludes another region of the surface that is outside of the threshold distance from the fingertip.

6. The computing system of claim 1, wherein the object comprises a hand or a stylus, and wherein the identifying of the target touch region comprises determining that the target touch region is within the threshold distance of an identified fingertip of the hand or an identified tip of the stylus represented in the image.

7. The computing system of claim 1, wherein the identifying of the target touch region based on the characteristic of the object represented in the image comprises identifying the target touch region based on at least one selected from among: a position of the object, an orientation of the object, and a shape of the object.

8. The computing system of claim 1, wherein a location of the identified target touch region varies with different characteristics of the object represented in the image.

9. A non-transitory machine-readable storage medium comprising instructions executable by a processing resource of a computing system comprising a touch-sensitive surface and a camera disposed above and pointed at the touch-sensitive surface, the instructions executable to:
   acquire, from the touch-sensitive surface, a location of a touch input detected by the touch-sensitive surface;
   acquire, from the camera, an image representing an object disposed between the camera and the touch-sensitive surface;
   identify a current touch input scenario for the computing system of a plurality of touch input scenarios for the computing system, including a hand input scenario and a stylus input scenario;
   identify a target touch region of the touch-sensitive surface based on a location of a portion of the object as represented in the image, wherein the target touch region is identified differently when the hand input scenario is identified than when the stylus input scenario is identified, wherein the identifying of the target touch region comprises determining that a first region of the touch-sensitive surface is within a threshold distance from the portion of the object, determining that a second region of the touch-sensitive surface is outside the threshold distance from the portion of the object, and including the first region in the target touch region and excluding the second region from the target touch region;
   determine whether the location of the touch input is within the identified target touch region of the touch-sensitive surface; and
   reject the touch input in response to determining that the location of the touch input is not within the identified target touch region of the touch-sensitive surface.

10. The non-transitory machine-readable storage medium of claim 9, wherein the instructions to reject comprise instructions to:
- receive touch rejection information from another component of the computing system; and
  - determine whether the received touch rejection information indicates that the detected touch input is to be rejected.

11. The non-transitory machine-readable storage medium of claim 10, wherein the instructions to reject comprise instructions to:
- provide the detected touch input to a touch input processing function of the computing system in response to determining that the location of the touch input is within the identified touch region of the touch-sensitive surface and determining that the touch rejection information does not indicate that the detected touch input is to be rejected.

12. The non-transitory machine-readable storage medium of claim 10, wherein:
- the instructions to receive the touch rejection information comprise instructions to receive the touch rejection information from an application that is in focus on a display of the computing system, the touch rejection information indicating a non-target touch region of the touch-sensitive surface, and
- the instructions to reject comprise instructions to reject the touch input in response to determining that the location of the touch input is within the non-target touch region of the surface.

13. The non-transitory machine-readable storage medium of claim 9, wherein the identified current touch input scenario is the hand input scenario and the object is a hand, and the instructions to identify the target touch region comprise instructions to, in response to the identified hand input scenario:
- identify a segmentation boundary at least partially representing an outer edge of the hand based on the image,
- extract a skeletal model for the hand based on characteristics of the object corresponding to the segmentation boundary,
- identify respective locations of fingertips of the hand relative to the touch-sensitive surface, based on the skeletal model, and
  - for each respective fingerprint location of the identified locations of the fingertips, identify a region of the touch-sensitive surface that is within the threshold distance of the respective fingertip location as a target touch region.

14. The non-transitory machine-readable storage medium of claim 9, wherein the identified current touch input scenario is the stylus input scenario, the object comprises a stylus, and the instructions to identify the target touch region comprise instructions to, in response to identified the stylus input scenario:
- identify, based on characteristics of the object represented in the image, a location of a tip of the stylus relative to the touch-sensitive surface, and
- identify, as the target touch region, a region of the touch-sensitive surface that is within the threshold distance of the identified location of the tip.

15. The non-transitory machine-readable storage medium of claim 9, wherein the identified current touch input scenario is an object placement scenario, the object is disposed on the touch-sensitive surface, and the instructions to identify the target touch region comprise instructions to, in response to the identified object placement scenario:
- identify a given region of the touch-sensitive surface including surface locations on which the object is disposed, and
  - identify, as a non-target touch region, the given region and a further region outside of and bordering the given region.

16. The non-transitory machine-readable storage medium of claim 9, wherein a location of the identified target touch region varies with different locations of the portion of the object represented in the image.

17. A method comprising:
- detecting, with a touch-sensitive surface, a touch input at a location of the touch-sensitive surface;
- capturing, with a camera of a computer system disposed above and pointed at the touch-sensitive surface, an image representing an object disposed between the camera and the touch-sensitive surface;
- identifying a target touch region of the touch-sensitive surface based on a characteristic of the object represented in the image, wherein the identifying of the target touch region comprises determining that a first region of the touch-sensitive surface is within a threshold distance from a target portion of the object, determining that a second region of the touch-sensitive surface is outside the threshold distance from the target portion of the object, and including the first region in the target touch region and excluding the second region from the target region;
- comparing the location of the touch input to the identified target touch region of the touch-sensitive surface; and
- in response to the comparing indicating that the location of the touch input is not within the identified target touch region, rejecting the detected touch input.

18. The method of claim 17, further comprising:
- detecting a trigger to initiate a touch rejection process, wherein the capturing is performed in response to the detecting of the trigger; and
- in response to the comparing indicating that the location of the touch input is within the identified target touch region, providing the detected touch input to a touch input processing function of the computer system.

19. The method of claim 17, wherein:
the object is a hand, and
the first region is within the threshold distance of a fingertip of the hand.

20. The method of claim 17, wherein the identifying of the target touch region based on the characteristic of the object represented in the image comprises identifying the target touch region based on at least one selected from among: a position of the object, an orientation of the object, and a shape of the object.

21. The method of claim 17, wherein a location of the identified target touch region varies with different characteristics of the object represented in the image.

* * * * *